US008732528B1

(12) United States Patent
Zhang et al.

(10) Patent No.: US 8,732,528 B1
(45) Date of Patent: May 20, 2014

(54) MEASURING TEST EFFECTS USING ADJUSTED OUTLIER DATA

(75) Inventors: Zhuo Zhang, Mercer Island, WA (US); Harry J. Paarsch, Seattle, WA (US); Patrick Ludvig Bajari, Bellevue, WA (US); Sameer R. Rajyaguru, Bellevue, WA (US); Ivan Eduardo Gonzalez, Seattle, WA (US); Devesh R. Raval, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 324 days.

(21) Appl. No.: 13/345,378

(22) Filed: Jan. 6, 2012

(51) Int. Cl.
*G06F 11/00* (2006.01)

(52) U.S. Cl.
USPC ............................... 714/37; 714/47.2; 714/25

(58) Field of Classification Search
USPC ............................. 714/37, 25, 47.2, 48, 2, 57
See application file for complete search history.

(56) References Cited

U.S. PATENT DOCUMENTS

| | | | |
|---|---|---|---|
| 6,038,598 A | 3/2000 | Danneels | |
| 6,714,975 B1 | 3/2004 | Aggarwal et al. | |
| 7,295,995 B1 | 11/2007 | York et al. | |
| 7,467,349 B1 | 12/2008 | Bryar et al. | |
| 8,166,155 B1 | 4/2012 | Rachmeler et al. | |
| 2002/0046281 A1 | 4/2002 | Cope | |
| 2002/0062245 A1 | 5/2002 | Niu et al. | |
| 2002/0078141 A1 | 6/2002 | Cohen et al. | |
| 2002/0116244 A1 | 8/2002 | Honarvar et al. | |
| 2002/0133720 A1 | 9/2002 | Sherman et al. | |
| 2002/0174219 A1 | 11/2002 | Mei et al. | |
| 2003/0101265 A1 | 5/2003 | Dantzig et al. | |
| 2003/0208578 A1 | 11/2003 | Taraborelli et al. | |
| 2004/0153358 A1 | 8/2004 | Lienhart | |
| 2004/0199584 A1 | 10/2004 | Kirshenbaum et al. | |
| 2005/0119939 A1 | 6/2005 | Henning et al. | |
| 2005/0262240 A1 | 11/2005 | Drees et al. | |
| 2007/0100824 A1 | 5/2007 | Richardson et al. | |
| 2007/0162260 A1 | 7/2007 | Nordstrom | |
| 2010/0169714 A1* | 7/2010 | Takahashi | 714/37 |
| 2012/0072781 A1* | 3/2012 | Kini et al. | 714/47.3 |
| 2012/0096320 A1* | 4/2012 | Caffrey | 714/57 |

OTHER PUBLICATIONS

Office action for U.S. Appl. No. 13/453,519, mailed on Mar. 7, 2013, Rachmeler et al., "System and Method for Website Experimentation", 15 pages.

Office action for U.S. Appl. No. 13/453,519, mailed on Oct. 8, 2013, Rachmeler, et al., "System and Method for Website Experimentation", 14 pages.

(Continued)

*Primary Examiner* — Sarai Butler
(74) *Attorney, Agent, or Firm* — Lee & Hayes, PLLC (57) ABSTRACT

This disclosure is directed to measuring test effects using adjusted outlier data. Test data and control data may include some outlier data (i.e., right-side tails of distribution curves), which may bias the resultant data. The outlier data may be adjusted to reduce bias. A cutoff point is selected along the distribution of data. Data below the cutoff is maintained and used to determine an effect of the data below the cutoff point. The effect of the data above the cutoff may be processed as follows. Predictor data is identified from the data below, but near, the cutoff point. The predictor data may then be used determine the effect of the outlier data that is above the cutoff point. In some embodiments, the predictor data may be weighted and combined with a weighted portion of the outlier data to determine an effect of the data above the cutoff point.

20 Claims, 5 Drawing Sheets

(56) References Cited

OTHER PUBLICATIONS

Non-Final Office Action for U.S. Appl. No. 13/453,519, mailed on Jun. 22, 2012, Kimberly A. Rachmeler et al, "System and Method for Website Experimentation", 13 pages.

Bryar, et al., Displaying Links at Varying Levels of Prominence to Reveal Emergent Paths Based on User Interaction, U.S. Appl. No. 11/186,357, filed Jul. 21, 2005, 65 pages.

Bryar, et al., Method and System for Displaying a Hyperlink at Multiple Levels of Prominence Based on User Interaction, U.S. Appl. No. 12/248,829, filed Oct. 9, 2008, 109 pages.

Eisenberg, Bryan "How to Decrease Sales by 90 percnet", ClickZ/ROI Marketing, Published on Feb. 21, 2003, Obtained from http://www.clickz.com/experts/crm/traffic/article.php/1588161, 2 pages.

Eisenberg, Bryan "How to Improve A/B Testing", http://www.inetasia.com/webtrends/how_to_improve_ab_testing.html, printed off the internet Jun. 8, 2006, 2 pages.

Eisenberg, Bryan "How to Increase Conversion Rate 1,000 Percent", ClickZ/ROI Marketing, http://www.clickz.com/experts/crm/traffic/article.php/1756031, printed off the internet on Jun. 7, 2006, 5 pages.

"Multivariate Testing by Memetrics", http://www.memetrics.com, printed off the internet Jun. 23, 2006, 1 page.

"Offermatica: Hosted A/B testing, multivariate testing, and landing page optimization tools", http://www.offermatics.com/whatis-1.0.html, printed from Internet on Jun. 8, 2006, 1 page.

"Increase Landing Page Conversion Rate with Web Page and Website Tesing—Optimost", http://www.optimost.com, printed off the internet Jun. 8, 2006, 1 page.

"Touch Clarity—Home page", http://www.touchclarity.com, printed off the internet Jun. 8, 2006, 1 page.

Kohavi, Ronny et al., "Emetrics Summit 2004: Front Line Internet Analytics at Amazon.com", Copyright 2004, Amazon.com, 31 pages.

Nordstrom, P.G., et al., Method and System for Collecting and Analyzing Time-Series Data, U.S. Appl. No. 11/374,875, filed Mar. 14, 2006, 72 pages.

Office action for U.S. Appl. No. 11/291,507, mailed on Oct. 27, 2008, Jeremy York, "Continuous Usability Trial for a Website", 34 pages.

Office action for U.S. Appl. No. 11/291,507, mailed on Oct. 8, 2009, Jeremy York, "Continuous Usability Trial for a Website", 28 pages.

Office action for U.S. Appl. No. 11/291,507, mailed on Mar. 29, 2010, Jeremy York, "Continuous Usability Trial for a Website", 42 pages.

Office action for U.S. Appl. No. 11/291,507, mailed on Jun. 3, 2009, Jeremy York, "Continuous Usability Trial for a Website", 26 pages.

Pope, E.E., et al., Method and System for Determining Interest Levels of Online Content Based on Rates of Change of Contecnt Access, U.S. Appl. No. 11/238,070, filed Sep. 28, 2005, 83 pages.

Pope, E.E., et al., System and Method for Indicating Interest of Online Content, U.S. Appl. No. 11/238,079, filed Sep. 28, 2005, 78 pages.

Scofield, C.L., et al., Method and System for Determining Interest Levels of Online Content Navigation Paths, U.S. Appl. No. 11/321,890, filed Dec. 29, 2005, 98 pages.

Scofield, C.L., et al., Method and System for Determining Interest Spaces Among Online Content Souces, U.S. Appl. No. 11/321,895, filed Dec. 29, 2005, 97 pages.

Scofield, C.L., et al., Method and System for Associating Keywords With Online Content Sources, U.S. Appl. No. 11/321,697, filed Dec. 29, 2005, 95 pages.

Jim Sterne, "Web Metrics—Proven Methods for Measuring Web Site Success", Wiley Publishing, Inc., Sep. 2002, entire book, 377 pages.

York, J., and R. Kohavi, Continuous Usability Trial for a Website, U.S. Appl. No. 11/291,507, filed Dec. 1, 2005, 49 pages.

* cited by examiner

MEASURING TEST EFFECTS USING ADJUSTED OUTLIER DATA

BACKGROUND

When sample data is collected and then subsequently analyzed, some data is often categorized as outlier data. The outlier data in some instances may be a result of incorrect readings by measurement equipment. However, some outlier data may be accurately measured, but only for a few respondents. When the outlier data includes relatively high values, such as outlier data from a right-side tail of a distribution of data, then the outlier data may complicate an analysis of test results. The existence of the outlier data may require a test to include additional samples or may require an analyzer to manipulate the data to remove the outliers. Collection of additional samples may be time consuming and expensive. Removal of outliers may bias the results when the outliers include accurate data that is not a result of an incorrect measurement reading. For example, removal of the outlier data may result in a measured difference that is statistically significant. Thus, any benefit gained by a test or experiment may include a heavy negative bias when the outlier data is removed from the samples.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to, among other things, measuring test effects using adjusted outlier data. The test effects may be resultant data that is a comparison of data obtained in a test environment (test data) and data obtained in a control environment (control data), which may be a state of the environment before a modification or change to the environment. The environment may be a computing environment, such as a user interface that tracks user interaction with content made available by the interface. For example, the computing environment may be an electronic marketplace, which may be modified to create a test environment (test electronic marketplace) for which data is collected and compared to the prior state of the electronic marketplace (control electronic marketplace) to determine the resultant data (test effect).

In accordance with various embodiments, the test data and control data may include some outlier data (i.e., right tails of distribution curves), which may skew or bias the resultant data, particularly when a sample size of the data is relatively small. Rather than extending the test to collect more data, which may be expensive and time consuming, the outlier data may be adjusted/modified as discussed herein to reduce bias and make use of a smaller sample size of the data.

To modify the outlier data, a cutoff point is selected along the distribution of data. Data below the cutoff is maintained and used to determine an effect of the data below the cutoff point (e.g., difference between the test data and control data, each being below the cutoff). The data above the cutoff (the outlier data), may be processed as follows. First, predictor data is identified from the data below, but near (e.g., within a threshold distance of), the cutoff point. A location and bandwidth of the predictor data may be identified using regression analysis of the data below and near the cutoff point. The predictor data may then be used determine the effect of the outlier data that is above the cutoff point. In some embodiments, the predictor data may be weighted and combined with a weighted portion of the outlier data to determine an effect of the data above the cutoff point. The total effect (resultant data) may be a combination of the effect of the data above the cutoff point and the effect of the data below the cutoff point.

By adjusting the outlier data as discussed above, fewer samples may be necessary to create unbiased and statistically significant results from a test. Thus, the test environment may have a shorter duration, which may enable increasing test cycles. Further, resultant data that includes less bias may enable better decisions on whether to implement the test environments into production.

The techniques and systems described herein may be implemented in a number of ways. Example implementations are provided below with reference to the following figures.

Illustrative Environment

Figure 1:
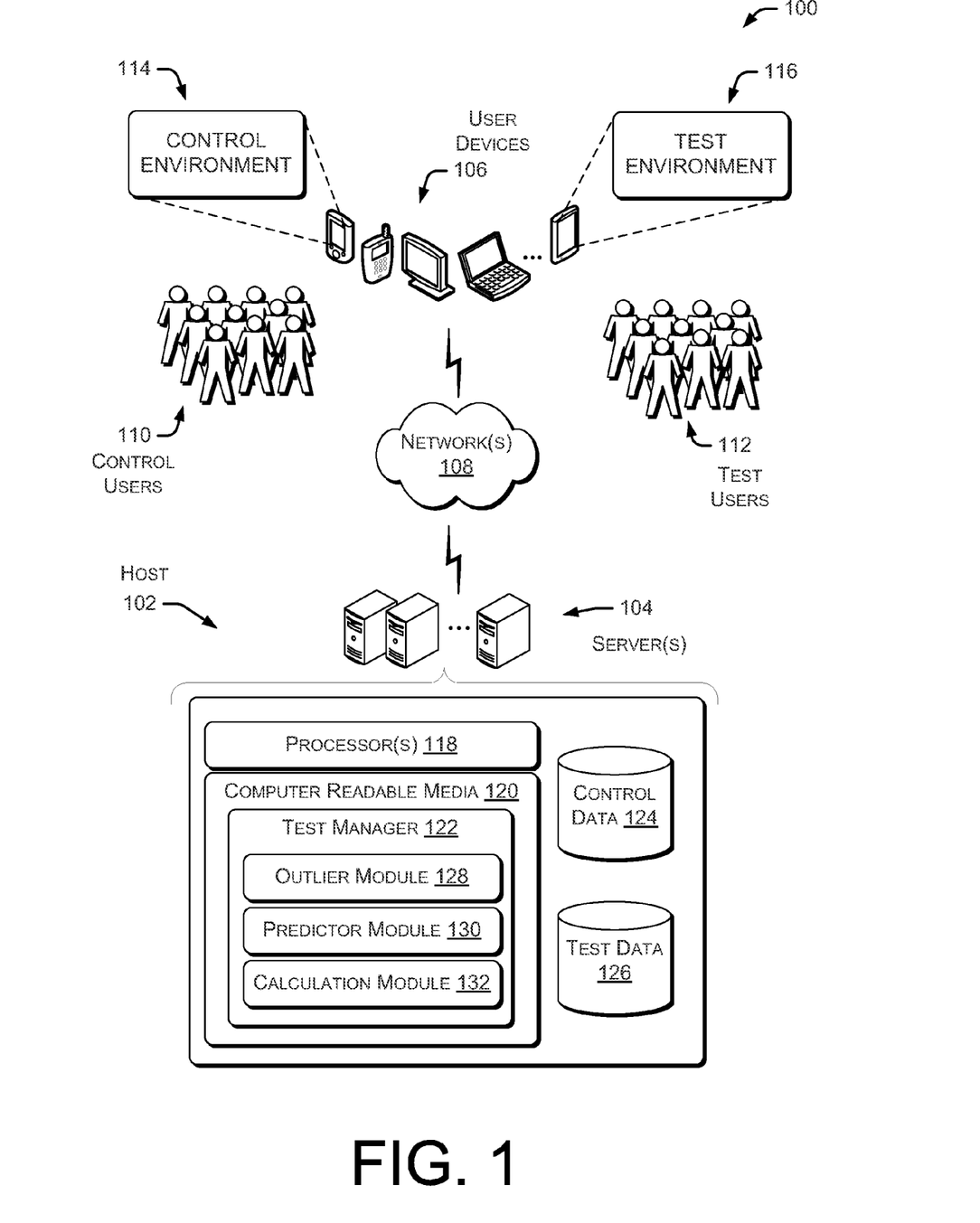
FIG. 1 is a schematic diagram of an illustrative environment to measure test effects using adjusted outlier data.

FIG. 1 is a schematic diagram of an illustrative environment 100 to measure test effects using adjusted outlier data. The environment 100 includes a host 102 that includes servers 104. The host 102, via the servers 104, may be capable of handling requests from many users and serving, in response, various information and data to user devices 106. The servers 104 may facilitate interaction with the client devices 106 via network(s) 108. In this manner, the host 102 may be representative of essentially any site supporting user interaction, including electronic marketplaces, or other types of sites that provide content to users.

The network(s) 108 are representative of many different types of networks, such as cable networks, the Internet, local area networks, mobile telephone networks, wide area networks and wireless networks, or a combination of such networks. The user devices 106 are illustrated as one or more of a wireless telephone, a personal computer, an electronic book reader (eBook reader), and a tablet computer. But, some example implementations include a television set-top box, a game console, a portable digital assistant (PDA), a portable gaming device, and other electronic or entertainment devices.

In some embodiments, the host 102 may provide data to users via the user devices 106. The user may interact with the data. The host may receive data responsive to the user interactions. In this way, the host 1012 may identify or track user behavior based on the data provided to the user and the data received responsive to the user interactions. For example, the data received responsive to the user interactions may be sales data resulting from sales in an electronic marketplace, click-through rate data for a given time period, or other types of data that the host may desire to measure. The host 102 may attempt to improve the data (e.g., increase sales, increase click-through rates, etc.) by implementing tests, which may be modifications or changes to the environment (e.g., user interface, etc.) that provides the data to the users.

In accordance with various embodiments, the environment 100 may include a control set of users 110 (control users) and a test set of users 112 (test users). The host may serve a control environment 114 to the control users 110 and may serve a test environment 116 to the test users 112. For example, the control environment 114 may be served to users in a first location while the test environment 116 may be served to users in a second location (which may or may not overlap with the first location). The test environment 116 may be used to implement the tests, which may be a modification to the control environment 114 or completely different environment than the control environment. The host 102, via the servers 104, may collect data associated with user interaction from both the control environment 114 and the test environment 116, which may be analyzed as discussed below by measuring test effects using adjusted outlier data.

Although this disclosure may provide many examples of interactions between the users (via the client devices 106) and the host 102 through an electronic marketplace distributed across the network(s) 108, these interactions may also be performed through other means (e.g., in person, through an intermediary, etc.) and through interactions with content other than electronic marketplaces. Accordingly, the disclosure is not limited to measuring user interactions with an electronic marketplace.

As illustrated, the server(s) 104 are equipped with one or more processor(s) 118 and computer-readable media 120. The computer-readable media 120 may include applications, modules, and/or data. In some embodiments, the computer-readable media 120 may include a test manager 122 to measure resultant data from interactions from the control users 110 (control data 124) and from the test users 112 (test data 126). The test manager 122 may include an outlier module 128, a calculation module 130, and a predictor module 132, each discussed in turn.

The outlier module 128 may determine a cutoff point of data in a distribution of the control data and the test data (right tail of the distribution data). The cutoff point, when determined, may be applied to both sets of data and may define the outlier data as data that is above the cutoff point. The cutoff point may vary based on the type of data received by the test manager 122. For example, when the test manager 122 receives a sales value associated with purchase of televisions, the cutoff point may be set as a larger value than when the sales value is associated with items having a much lower value (e.g., toiletries, food, etc.). As discussed herein, the outlier data is accurate data and is not subject to error, such as measurement errors, recordation errors, or other types of error which may be more common in scientific data, such as in measurements of test results that use scientific measurement apparatuses.

The predictor module 130 may identify predictor data that is near, but below, the cutoff point. In some embodiments, the predictor data is less than a threshold distance below the cutoff. The predictor data may be used to determine an effect of the data above the cutoff point. In some embodiments, the predictor module 130 may use regression techniques to identify the predictor data.

The calculation module 132 may calculate the effect of the test by comparing the test data and the control data. To calculate the effect, the calculation module 132 may determine an effect based on a difference in the test data below the cutoff point and the control data below the cutoff point. In addition, the calculation module 132 may use the prediction data to determine an effect of the outlier data (data above the cutoff), and thus calculate an effect of adjusted outlier data. In some embodiments, the calculation module 132 may determine the effect of the test data above the cutoff point using a weighted sum of the predictive data and the outlier data, where the predictive data and the outlier data are each weighted (e.g., 50/50, 30/70, etc.). The calculation module 132 may calculate a total effect (resultant data) by adding or otherwise combining an effect from the adjusted outlier data to the effect from the data below the cutoff point.

In some embodiments, the test manager 128 may determine whether to implement a change (e.g., the test environment) based on the total effect observed from the test data 126 compared to the control data 124 using the adjusted outlier techniques described above. When the total effect is below a threshold value, the test manager 122 may determine not to implement the change.

Illustrative Operations

Figure 2:
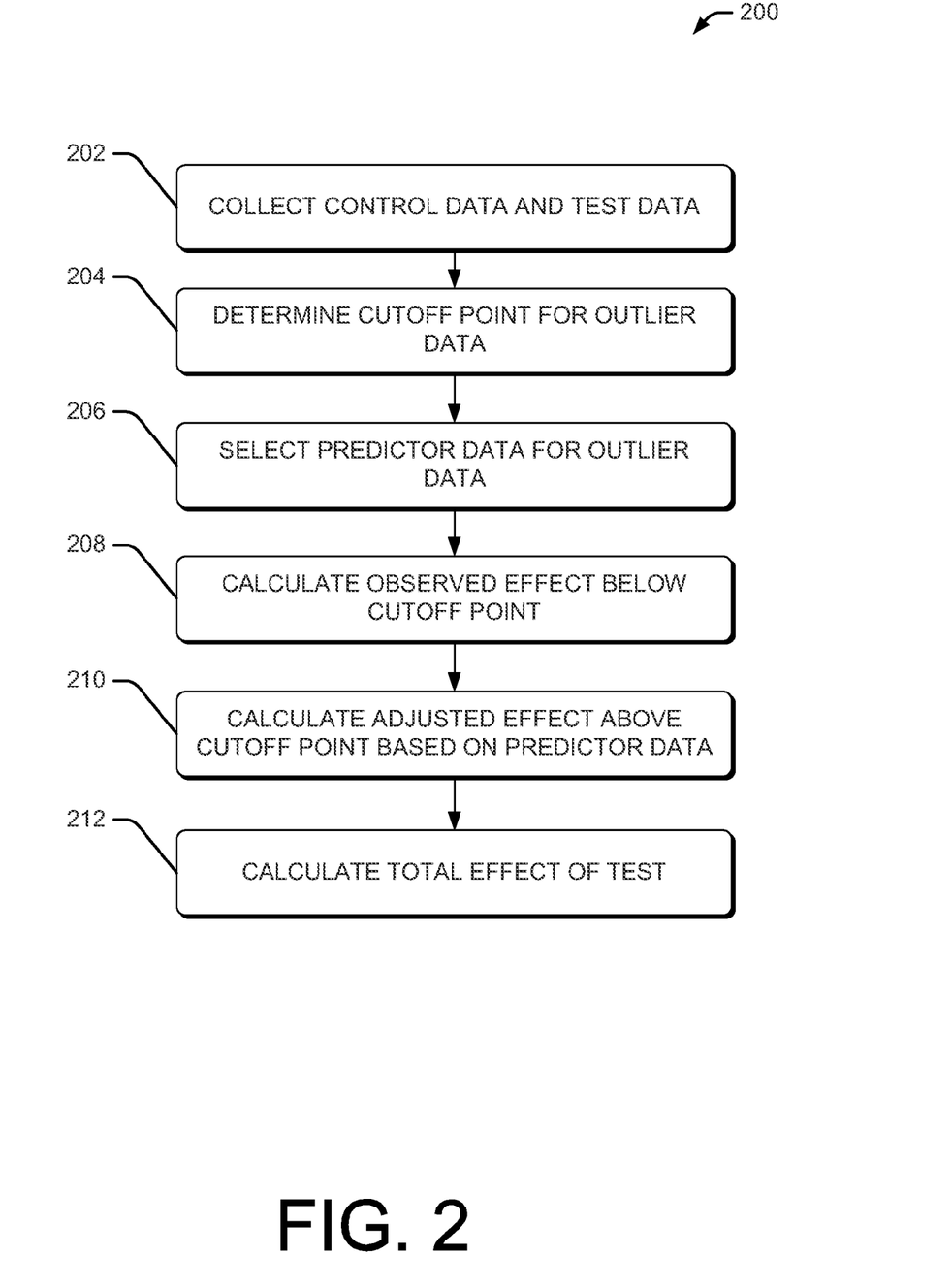
FIG. 2 is a flow diagram of an illustrative process to measure test effects using adjusted outlier data.
Figure 4:
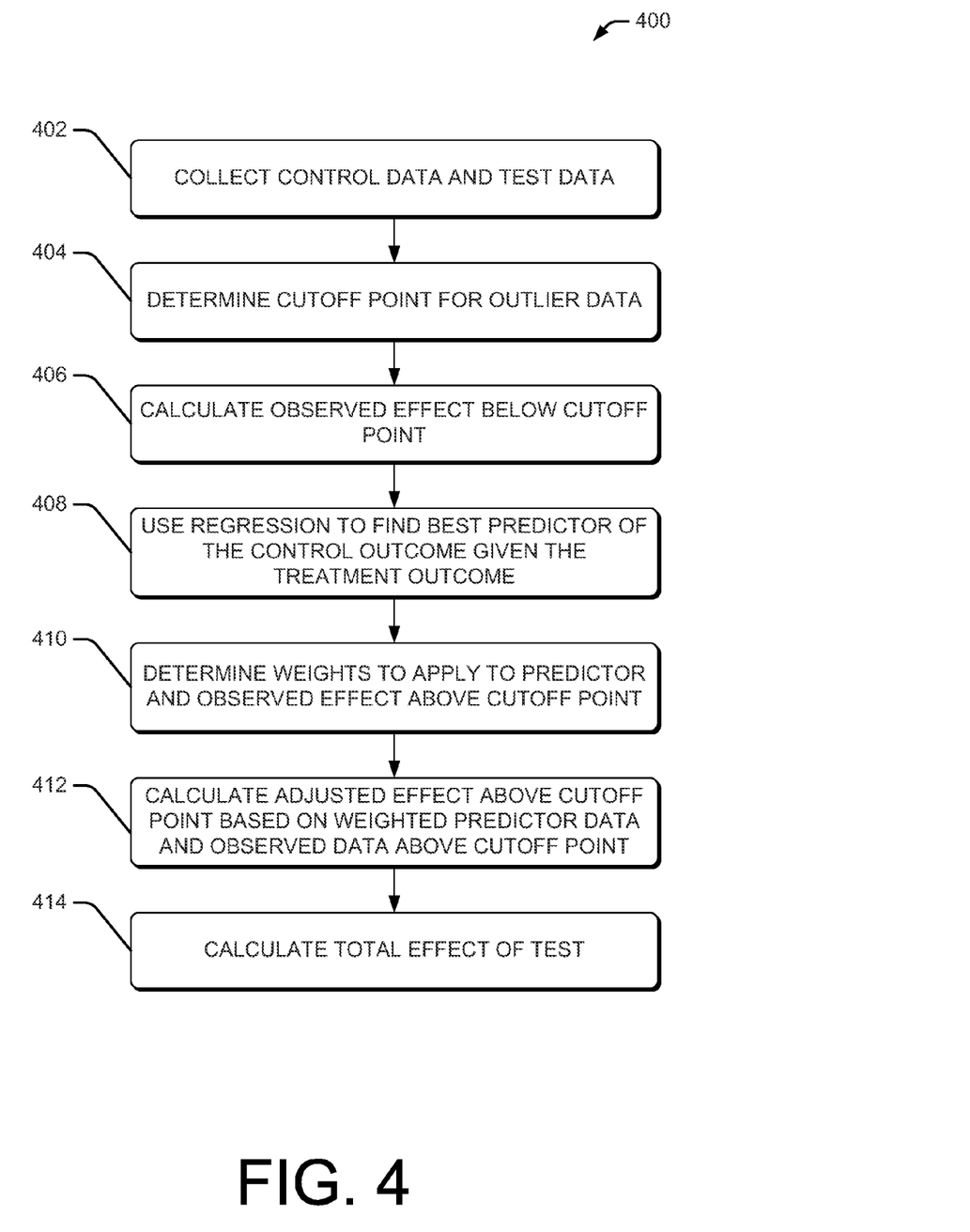
FIG. 4 is a flow diagram of an illustrative process to weight predictor data and observed outlier data to calculate adjusted outlier data.
Figure 5:
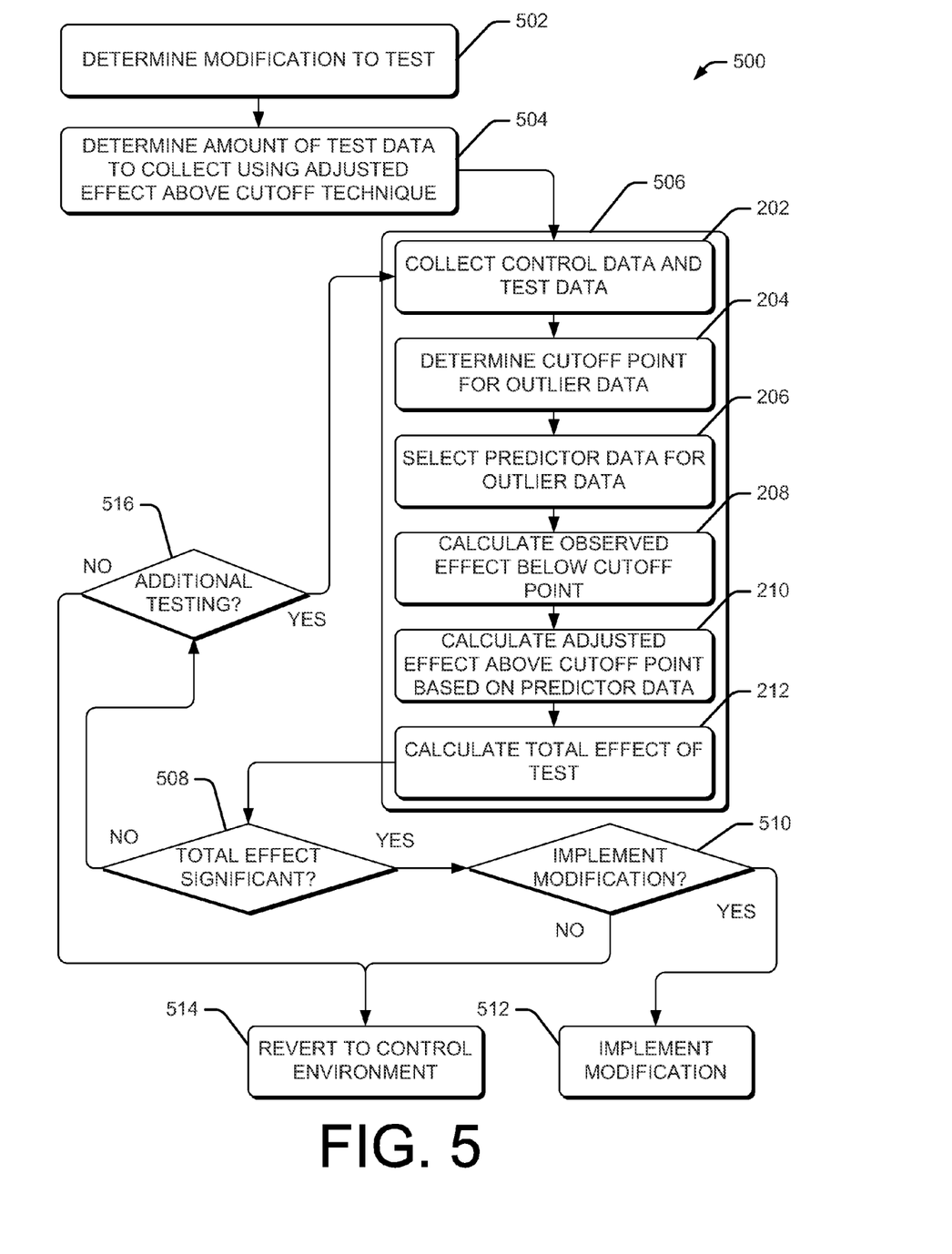
FIG. 5 is a flow diagram of an illustrative process to test a modification of an environment and determine whether to implement the modification based on results that include adjusted outlier data.

FIGS. 2, 4, and 5 show processes to measure test effects using adjusted outlier data. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly.

The processes are described with reference to the environment 100 and may be performed by the servers 104 that execute the test manager 122 and various modules. Of course, the processes may be performed in other similar and/or different environments.

FIG. 2 is a flow diagram of an illustrative process 200 to measure test effects using adjusted outlier data. Although the following discussion describes analysis of sales data, the process 200 may be used to analyze other types of data.

At 202, the test manager 122 may collect the control data 124 from interactions of the control users 110 with the control environment 114 and may collect the test data 126 from interactions of the test users 112 with the test environment 116. The control data 124 and test data 126 may be data of a same type that enables a comparison of the data. In some embodiments, the data may be sales data, such as gross merchandise sales (GMS) for users over a predetermined time period.

At 204, the outlier module 128 may determine a cutoff point that identifies the outlier data within the control data 124 and the test data 126. The cutoff point may define the right tail of a distribution, which includes the outliers. The outliers may be data samples that include a relatively small sample size and include the highest values. For example, in retail transactions, totals sales for a user may include an average of $200 for a week. However, some outlier data may include a few sales by users that exceed $10,000. Thus, the cutoff point may be selected at a point where the sample size drops below a predetermined threshold, such as an x percentile of the data, where x may be between 90.00 and 99.99 (or other thresholds), assuming two significant digits).

At 206, the predictor module 130 may select the predictor data which may be used to determine the effect of the outlier data (referred to herein as adjusted outlier data). However, the outlier data may or may not be used in conjunction with the predictor data. The predictor module 130 may use regression techniques to determine the location (data points) and bandwidth (number of data points) to use in the predictor data.

At 208, the calculation module 132 may calculate an observed effect below the cutoff point as a difference between the test data 126 and the control data 124 for data points below the cutoff point.

At 210 the calculation module 132 may calculate or determine an adjusted effect above the cutoff point based at least in part on the predictor data. In some embodiments, the predictor data may be weighted and combined with data from the data points above the cutoff point (the outlier data) to determine an effect that is representative of an adjusted difference between the test data 126 and the control data 124 for data points above the cutoff point.

At 212, the calculation module 132 may calculate a total effect (resultant data) of the test to indicate a realized increase (e.g., increase in sales, increase in click-thorough rates, etc.). By using the adjusted outlier approach of the operations 206 and 210, the amount of data collected at the operation 202 may be less than when the test removes the outlier data or preserves the outlier data without the operations 206 and 210.

Figure 3:
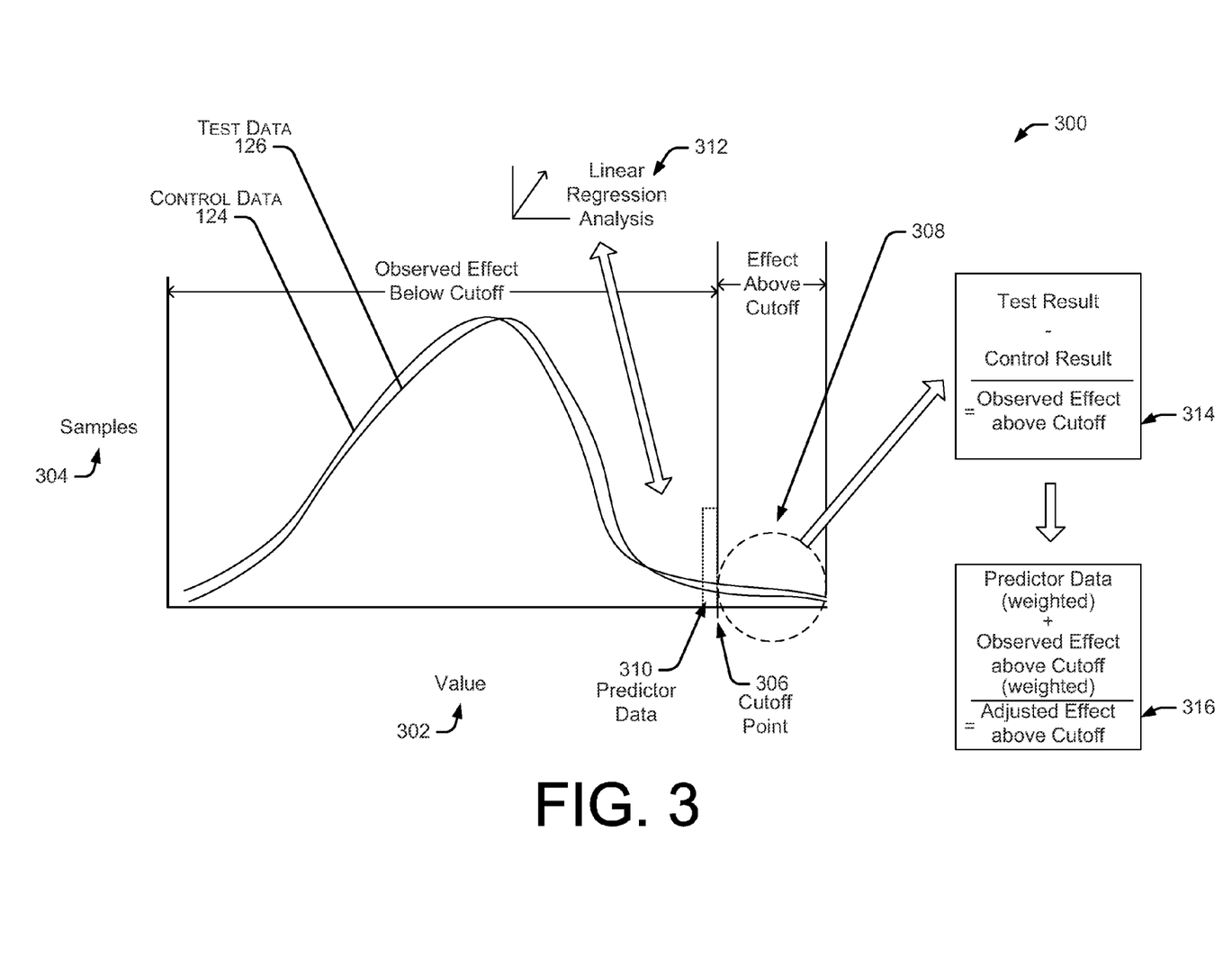
FIG. 3 is an illustrative graph of control data and test data, which are analyzed to determine a test effect using adjusted outlier data.

FIG. 3 is an illustrative graph 300 of control data and test data, which are analyzed to determine a test effect using adjusted outlier data. The illustrative graph 300 shows a plot of the control data 124 and the test data 126 with respect to values 302 (x axis) and a number of samples 304 (y axis).

The illustrative graph 300 shows a cutoff point 306, which may be determined by the outlier module 128 or may be predetermined for a given set of data (e.g., same cutoff point as pervious test). The cutoff point 306 may be located at a left-most boundary of outlier data 308, thereby defining the outlier data 308. In some embodiments, the number of samples (e.g., users) having data points in the outliers may be different for the test data 126 and the control data 124. Thus, the test data 126 may have more, fewer, or a same number of samples in the outlier data 108 as the control data 124.

The predictor module 130 may identify predictor data 310 as a portion of the data sets having a bandwidth and a location (value range). The predictor data 310 may be identified using regression techniques, such as by using a linear regression analysis 312. In some embodiments, a boundary of the predictor data 310 may align or be defined by the cutoff point 306 (e.g., a right-side boundary of the predictor data may be the cutoff point 306, etc.). The predictor data 310 may also be spaced apart from the cutoff point 306 by a predetermined distance. In various embodiments, the boundary data may include a portion of the outlier data.

The calculation module 132 may determine the observed effect above the cutoff point 314 as a difference between the test data 126 and the control data 124, both using data points above the cutoff point. However, as discussed with respect to the process 200, the observed effect above the cutoff may be at least adjusted, or possibly replaced, by the predictive data 310.

In various embodiments, the effect of the outlier data may be adjusted to include an effect based on the predictive data (PD), which may be weighted, and the observed effect above the cutoff (OEAC), which may also be weighted, to determine an adjusted effect above the cutoff (EFAC) 316. For example, the EFAC 316 may be expressed by Equation 1 as follows:

$$EFAC = pPD + (1-p)OEAC \qquad \text{Equ. (1)}$$

where p is a number between 0 and 1. However, the EFAC may also be determined in some embodiments only using the predictive data 310.

FIG. 4 is a flow diagram of an illustrative process 400 to weight predictor data and observed outlier data to calculate adjusted outlier data.

At 402, the test manager 122 may collect the control data 124 from interactions of the control users 110 with the control environment 114 and may collect the test data 126 from interactions of the test users 112 with the test environment 116. The control data 124 and test data 126 may be data of a same type that enables a comparison of the data. In some embodiments, the data may be sales data, such as a gross amount of sales for a user over a predetermined time period.

At 404, the outlier manager 128 may determine a cutoff point that identifies the outlier data within the control data 124 and the test data 126. The cutoff point may define the right tail of a distribution, which includes the outliers. The outliers may be data samples that include a relatively small sample size and include the highest values.

At 406, the calculation module 132 may calculate an observed effect from the test based on the data observed from data points below the cutoff. For example, the calculation module 132 may calculate an average difference between the test data 126 and the control data 124.

At 408, the predictor module 130 may use regression to find a predictor of the control outcome given the test outcome. In some embodiments, the predictor module 130 may determine a best predictor of the test value above the cutoff by regressing the test outcomes on the control outcomes for the group of observations in a neighborhood below, but near, the cutoff (e.g., observations between the x and y percentile, where both x and y are below the cutoff). However, either x or y may be located at the cutoff. The predictor module 130 may determine a sample size (or bandwidth) of the predictor data in addition to a location of the predictor data.

Second, using this data, the predictor module 130 may determine a predictor of the control outcome given the test outcome using regression. Given these predictors, the predictor module 130 may calculate (or estimate) a difference between the predicted test outcome above the cutoff and a sample mean of the control outcome above the cutoff.

At 410, the predictor module 130 may determine weights to apply to the predicted test outcome data determined at the operation 408 and the actual test outcome and control outcome above the cutoff point. As discussed above, the weight may be applied using Equation 1.

At 412, the calculation module 132 may calculate the adjusted effect above the cutoff point based on the weighted predictor data and the observed data above the cutoff point.

At 414, the calculation module 132 may calculate the total effect of the test by combining the result of the operation 412 and the result of the operation 406.

FIG. 5 is a flow diagram of an illustrative process 500 to test a modification of an environment and determine whether to implement the modification based on results that include adjusted outlier data.

At 502, the test manager 122 may determine a modification to test. The modification may be a change to an environment, such as a user interface used to access data. The state of the environment before the modification is the control environment and the environment after the modification is the test environment. The control environment and the test environment may be accessible by different groups (the control users 110 and the test users 112, respectively) at a same time or at different times. When the environment is a user interface, the test may track user interaction with content made available by the environments. For example, the computing environment may be an electronic marketplace, which may be modified to create a test environment (test electronic marketplace), for which data is collected and compared to the prior state of the electronic marketplace (control electronic marketplace) to determine the resultant data (test effect).

At 504, the test manager 122 may determine an amount of test data to collect using the adjusted effect above the cutoff technique discussed herein. In some embodiments, this determination may be an initial determination, which may be revised after sampling of the data as discussed below.

At 506, the test data and the control data may be collected and the total effect of the test may be calculated in accordance with the process 200, the process 400, or a combination of both. However, for convenience, FIG. 5 is shown with the operations 202 through 212 for discussion purposes. Thus, following the operation 504, the test manager 122 may collect the control data 124 and the test data 126, and after the total effect of the test is calculated, the process 500 may advance to a decision operation 508.

At 508, the test manager 122 may determine whether the total effect is significant, and thus greater than a threshold effect. For example, the total effect may be within a margin of error of the sample size, and thus result in a determination that the total effect is not significant. In some embodiments, the operation 508 may be performed using a boot strap process or using a delta method or first order asymptotic method. When the total effect is determined to be significant at the decision operation 508, then the process 500 may proceed to a second decision operation 510 (via the "yes" route from the decision operation 508).

At 510, the test manager 122 may determine whether to implement the modification. In some embodiments, the test manager 122 may report the test effect and receive a decision from user input based on the report. In various embodiments, the test manager 122 may implement the modification without user input. When the modification is to be implemented at the decision operation 510 (following the "yes" route), then the test manager 122 may implement the modification at 512. The implementation may involve providing the test environment to all users and implementing or labeling the test environment as the control environment. In some embodiments, the implementation may be limited to specific populations or regions and thus may not be completely rolled out to all the users (e.g., maintained for the test users 112, but not used for the control users 110, etc.). When the test manager 122 determines not to implement the modification at the decision operation 510 (following the "yes" route), then the test manager may revert the environment to the control environment at the operation 514.

Returning to the decision operation 508, when the total effect is determined to not be significant at the decision operation 508, then the process 500 may proceed to a third decision operation 516 (via the "no" route from the decision operation 508). At 516, the test manager 122 may determine whether to perform additional testing. The additional testing may test different variations of the environment, collect more data for the previously tested environment, use a different sample population, or modify the test in other ways. When the test manager 122 determines to provide additional testing at the decision operation 516, then the process 500 may continue at the operation 506, such as by colleting the control data 124 and the test data 126 in accordance with the process 200 or the process 400. When the test manager 122 determines not to provide additional testing at the decision operation 516, then the test manager 122 may return the environment back to the control environment at the operation 514.

Illustrative Regression Techniques

As discussed above, the adjusted effect of the test data and the control data above the cutoff point is predicted using data in a neighborhood below the cutoff instead of assuming these data points after the cutoff point have no effect, and thus removing them when calculating the total effect. Regression techniques are used to estimate the effect in the neighborhood of the cutoff. From T pairs of observations $\{(x_t, y_t)\}_{t=1}^T$ below a cutoff point, the predictor module 130 may fit a line which minimizes the sum of squared residuals; that is, may chose $\alpha$ and $\beta$ to minimize in accordance with Equation 2:

$$\Sigma_{t=1}^T (y_t - \alpha - \beta x_t)^2. \quad \text{Equ. (2)}$$

Armed with a reliable estimate of the effect in the neighborhood of the cutoff point, the predictor module 130 may then predict the effect for test data above the cutoff. This strategy may eliminate bias introduced by trimming (disregarding the outliers), and may only introduce a small increase in the sample variance.

In accordance with some embodiments, local linear regression is used to estimate the effect of the data above the cutoff. Local linear regression is a technique to approximate the conditional mean locally at a given point, say z, by running a linear regression solely using observations close to z. A bandwidth parameter determines the neighborhood of the predictor data. The larger the bandwidth parameter, the more data is used but the potential for bias increases. One major advantage of the local linear regression is that it has no bias at boundary points.

Gross merchandise sales (GMS) of the test is denoted by $y_1$ and the GMS of the control is denoted by $y_0$. However, other values may be measured or used other than GMS. To run the local linear regression, the predictor module 130 may order both the test observations and control observations by their percentile of GMS. Thus, the 99.9 percentile of GMS for the test observations is matched with the 99.9 percentile of GMS for the control observations, and so forth for the other percentile within the bandwidth. The predictor module 130 may then run the following regressions shown in Equations 3 and 4 in the neighborhood of the cutoff:

$$y_0 = \alpha_0 + \beta_\alpha y_1 + u_0 \quad \text{Equ. (3)}$$

$$y_1 = \alpha_1 \beta_1 y_0 + u_1. \quad \text{Equ. (4)}$$

These regressions give the predicted test percentile given the control percentile value, and the predicted control percentile value given the test percentile value. For observations above the cutoff, the predictor module 130 then uses these regressions to predict a test value for each control value, and control value for each test value. The estimator is shown in Equation 5, for a cutoff percentile of 0.999 (however, other cutoff percentiles may be used):

$$\Delta = 0.999 * (\overline{y_{.999,1}} - \overline{y_{.999,0}}) + \\ 0.001 * \left[ \frac{1}{2} (\widehat{\overline{y_{.001,1}}} - \overline{y_{.001,0}}) + \frac{1}{2} (\overline{y_{.001,1}} - \widehat{\overline{y_{.001,0}}}) \right]. \quad \text{Equ. 5}$$

Here, the bar over a variable denotes that it is the sample mean, while the hat denotes the predicted average value. The subscript 0.999 denotes a mean below 99.9 percentile, while the subscript 0.001 denotes a mean above the 99.9 percentile; the subscripts 0 and 1 denote control and test, respectively.

The main parameters chosen here are the cutoff percentile level and the bandwidth parameter. A width of the window of data to be included when using the local linear regression can also be calculated.

Illustrative Algorithm (i) Cross Validation

To apply this technique, the predictor module 130 may select both the cutoff point from the data and the bandwidth that is used for the local linear regression. A data-driven technique may be used to determine both of these parameters referred to in literature as "cross-validation."

To do this, the predictor module 130 begins with a dataset that is approximately as large as typical test dataset. The predictor module 130 randomly selects half of the observations to be members of the test group and applies the effect that it is trying to estimate (for example, a 1.005% effect) to the test observations. Given this dataset, the predictor module 130 can measure the "true" effect for this dataset. The predictor module 130 may remove any extreme one-off outliers (for example, $20,000 when the tail ends at $10,000).

Using this data, the predictor module 130 may randomly resample observations into multiple simulated datasets, each with an equivalent number of test and control observations. On each simulated dataset, the predictor module 130 may construct a grid across trimming points (0.995, 0.996, etc.) and bandwidths for the local smoothing procedure (10, 20, 30, etc.). The predictor module 130 may then estimate the bias corrected effect for each set of trimming points and bandwidths and calculate both the bias and variance across simulated datasets, relative to the true effect. The predictor module 130 may then choose the estimator with the lowest variance for a bias below 5% of the effect (or other value).

(ii) Local Linear Regression

The predictor module 130 may estimate the mean below the cutoff point and run the local linear regressions using the bandwidth and cutoff point that was optimal in the above cross-validation process. The predictor module 130 may calculate the effect using the estimated coefficients from the local linear regression, as shown in Equation 6 assuming a 99.9% cutoff point (however, other cutoff points may be used):

$$\Delta = 0.999 * (\overline{y_{.999,1}} - \overline{y_{.999,0}}) + \\ 0.001 * \left[\frac{1}{2}(\widehat{y_{.001,1}} - \overline{y_{.001,0}}) + \frac{1}{2}(\widehat{y_{.001,0}} - \overline{y_{.001,0}})\right].$$

Equ. (6)

One problem that one can potentially encounter is that the number of test observations and control observations are not the same. This could happen even with a 50:50 test/control design with small discrepancies between test and control. More than one test or an unbalanced test and control may also cause the number of test and control observations to vary. In this case, the predictor module 130 may match the same percentiles on the smaller sample to those on the larger sample. (For example, the 99.7% percentile of control observations to the same percentile of the test observations.)

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    under control of one or more servers configured with executable instructions,
        collecting test data and control data, the control data being collected from user interaction with a user interface and the test data being collected from user interaction with a modified version of the user interface during a test;
        determining a cutoff point that defines outlier data in the control data and the test data;
        identifying data that is below the cutoff point by less than a threshold distance, the data used to predict an effect of the test data above the cutoff point;
        calculating an observed effect below the cutoff point;
        calculating an adjusted effect above the cutoff point based at least in part on the data that is below the cutoff point by less than the threshold distance;
        calculating a total effect of the test by combining the observed effect and the adjusted effect; and
        determining whether to implement the modified version of the user interface based at least in part on the total effect of the test.

2. The method as recited in claim 1, further comprising:
    determining whether the total effect is greater than a threshold effect; and
    implementing the modified version of the user interface when the total effect is greater than the threshold effect.

3. The method as recited in claim 1, wherein the control data is sales data generated by user interaction with the user interface associated with an electronic marketplace and the test data is sales data generated by user interaction with the modified version of the user interface associated with the electronic marketplace.

4. A method, comprising:
    collecting control data and test data, the test data being collected using a modified version of an environment that is used to collect the control data;
    determining a cutoff point to define outlier data in the control data and the test data;
    selecting, using one or more servers, predictor data as a portion of the control data and the test data that is below the cutoff point, the predictor data used to predict an effect of the test data above the cutoff point;
    calculating, using the one or more servers, an observed effect below the cutoff point;
    calculating, using the one or more servers, an adjusted effect above the cutoff point based at least in part on the predictor data; and
    calculating, using the one or more servers, a total effect of the test data at least partly by combining the observed effect and the adjusted effect.

5. The method as recited in claim 4, wherein the identifying the predictor data includes using regression to determine a location and bandwidth of the predictor data.

6. The method as recited in claim 5, wherein the regression is local linear regression that orders the test data and the control data by percentile of gross merchandise sales (GMS).

7. The method as recited in claim 4, wherein the calculating the adjusted effect above the cutoff point is performed using a weighted sum of the predictor data and an observed effect of the outlier data.

8. The method as recited in claim 7, wherein the predictor data and the outlier data is equally weighted in the weighted sum.

9. The method as recited in claim 4, further comprising determining whether to implement the modified environment based at least in part on the total effect.

10. The method as recited in claim 4, wherein the test data is sales data generated by user interaction with the environment and the test data is sales data generated by user interaction with a modified version of the environment.

11. The method as recited in claim 4, wherein the environment is user interface of an electronic marketplace and the control data and the test data are sales data resulting from sales of goods, services, or both.

12. The method as recited in claim 4, further comprising:
determining whether the total effect is greater than a threshold effect; and
implementing the modified environment when the total effect is greater than a threshold effect.

13. The method as recited in claim 4, wherein the outlier data is not subject to measurement failures or measurement inconsistencies.

14. One or more computer-readable media storing computer-executable instructions that, when executed on one or more processors, performs acts comprising:
collecting control data following user interaction with an environment;
collecting test data following user interaction with a modified version of the environment;
determining a cutoff point to define outlier data in the control data and the test data;
selecting predictor data as a portion of the control data and the test data that is below the cutoff point, the predictor data used to predict an effect of the test data above the cutoff point;
calculating an observed effect below the cutoff point;
calculating an adjusted effect above the cutoff point based at least in part on the predictor data; and
calculating a total effect of the test data at least partly by combining the observed effect and the adjusted effect.

15. The one or more computer-readable media as recited in claim 14, wherein the calculating the adjusted effect above the cutoff point is performed using a weighted sum of the predictor data and an observed effect of the outlier data.

16. The one or more computer-readable media as recited in claim 14, wherein the selecting the predictor data includes using regression to determine a location and bandwidth of the predictor data.

17. The one or more computer-readable media as recited in claim 16, wherein the regression is local linear regression that orders the test data and the control data by percentile of sales.

18. The one or more computer-readable media as recited in claim 14, wherein the acts further comprise determining whether to implement the modified version of the environment based at least in part on the total effect.

19. The one or more computer-readable media as recited in claim 14, wherein the environment is a user interface.

20. The one or more computer-readable media as recited in claim 14, wherein the test data is sales data generated by user interaction with the environment and the test data is sales data generated by user interaction with the modified version of the environment.

* * * * *